US005847707A

United States Patent [19]

Hayashida

[11] Patent Number: 5,847,707
[45] Date of Patent: *Dec. 8, 1998

[54] ICON MENU DISPLAY DEVICES AND METHODS

[75] Inventor: Yasuto Hayashida, Tachikawa, Japan

[73] Assignee: Casio Computer Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 512,111

[22] Filed: Aug. 7, 1995

[30] Foreign Application Priority Data

Aug. 29, 1994 [JP] Japan ..................................... 6-203889

[51] Int. Cl.⁶ ....................................................... G06F 9/00
[52] U.S. Cl. ............................ 345/348; 345/351; 345/349
[58] Field of Search ..................................... 395/348, 349, 395/351, 350, 352, 334; 345/348, 349, 351, 352, 334, 333, 347

[56] References Cited

U.S. PATENT DOCUMENTS

| | | | |
|---|---|---|---|
| 5,317,687 | 5/1994 | Torres | 395/349 |
| 5,418,946 | 5/1995 | Mori | 395/601 |
| 5,491,795 | 2/1996 | Beaudet et al. | 395/346 |
| 5,506,952 | 4/1996 | Choy et al. | 395/348 |
| 5,592,605 | 1/1997 | Asuma et al. | 395/348 |

*Primary Examiner*—Raymond J. Bayerl
*Assistant Examiner*—Cao H. Nguyen
*Attorney, Agent, or Firm*—Frishauf, Holtz, Goodman, Langer & Chick

[57] ABSTRACT

When a menu is displayed, a stored state of a document memory 5 which is capable of storing a plurality of document files is checked. When new document files are creatable in the document memory 5, an icon I, II or III having a different shape indicating a different creatable file count is displayed on the display. If no more new document files are creatable in the document memory, a document-uncreatable icon is displayed on the display.

2 Claims, 11 Drawing Sheets

DOC. FILE-CREATABLE
ICON I

DOC. FILE-CREATABLE
ICON II

DOC. FILE-CREATABLE
ICON III

DOC. FILE-
UNCREATABLE
ICON

DOCUMENT ICON I

FIG.3B

DOCUMENT ICON II

FIG.3C

DOCUMENT ICON III

FIG.4A

DOC. FILE-CREATABLE
ICON I

FIG.4B

DOC. FILE-CREATABLE
ICON II

FIG.4C

DOC. FILE-CREATABLE
ICON III

FIG.4D

DOC. FILE-
UNCREATABLE
ICON

"BLOWOFF" IMAGE

FIG.11B

DOCUMENT NAME
DISPLAYED IN
"BLOWOFF" IMAGE

ICON MENU DISPLAY DEVICES AND METHODS

BACKGROUND OF THE INVENTION

1. Field of the Invention

The present invention relates to file processing systems and more particularly to an icon menu displaying method in a file processing system which opens a plurality of data files in a memory to process data in the respective data files.

2. Description of the Related Art

Conventionally, when a data file (a word processor created document or a spreadsheet) is created in a storage such as a RAM disk or a magnetic disk device which is capable of storing a plurality of files in a document processor such as a word processor, a file creation mode is generally started up by clicking a fixed-form icon which instructs the processor to create the data file with a pointing device such as a mouse. Once the icon is clicked, it is determined whether there is any unused data file storage space in the storage. If so, a new data file is created there. If not, an error message such as "No more documents are creatable." is displayed.

A word processor document created in the storage in this way is displayed as a document icon in the form of a document on the display screen. By selecting that document icon by clicking the mouse twice, a document corresponding to that document icon is moved into an edit mode where the document is editable.

In a word processor with desktop calculator functions, a desktop calculator-shaped icon is displayed on the display screen. By selecting the icon, for example, by a twice clicking operation of the mouse, a desktop calculator mode which provides desktop calculator functions is started up.

However, such conventional document processors have the following problems. The icons which instruct the processor to create a data file are of a fixed-form type having the same shape, whether or not they are capable of creating a new data file in the storage. Thus, confirmation about whether a data file is creatable in the storage relies on the user's memory or otherwise requires the user to create the data file (for example, to click the icon once or twice). Thus, it is impossible to understand at a glance on the menu screen whether a new data file can be created in the storage which has already stored a plurality of data files. Thus, if the creation of a new data file is impossible, the user is required to perform useless operations, inconveniently.

Since document icons indicative of document files in the storage are discriminated from each other only in accordance with the shapes thereof, there is a possibility that a document file different from a desired one will be opened unless the relationship in correspondence between the document icons and documents is stored to thereby reduce the efficiency of the operation.

SUMMARY OF THE INVENTION

It is therefore an object of the present invention to allow the user to intuitively and easily recognize on the display the current state of use of a storage such as a RAM disk which is capable of storing data files, that is, whether the storage has any empty area where new data files are creatable to thereby to make easy and convenient the operation of creating the new data files.

It is another object of the present invention to easily and rapidly recognize information incidental to an icon such as the names of a data file and a functional mode displayed on the display screen without calling the contents of the data files on the screen.

In order to achieve the above objects, the present invention provides an icon menu display device in a file processing system which opens a plurality of data files in a memory and processes the opened data files individually, including:

means for detecting the respective open states of the data files in the memory when a menu is displayed;

means for selecting a file icon, the kind of which depends on the number of opened data files, from among a plurality of kinds of file icons on the basis of the respective open states of the detected data files; and means for indicating the selected file icon on a display.

DETAILED DESCRIPTION OF THE PREFERRED EMBODIMENTS

Figure 1:
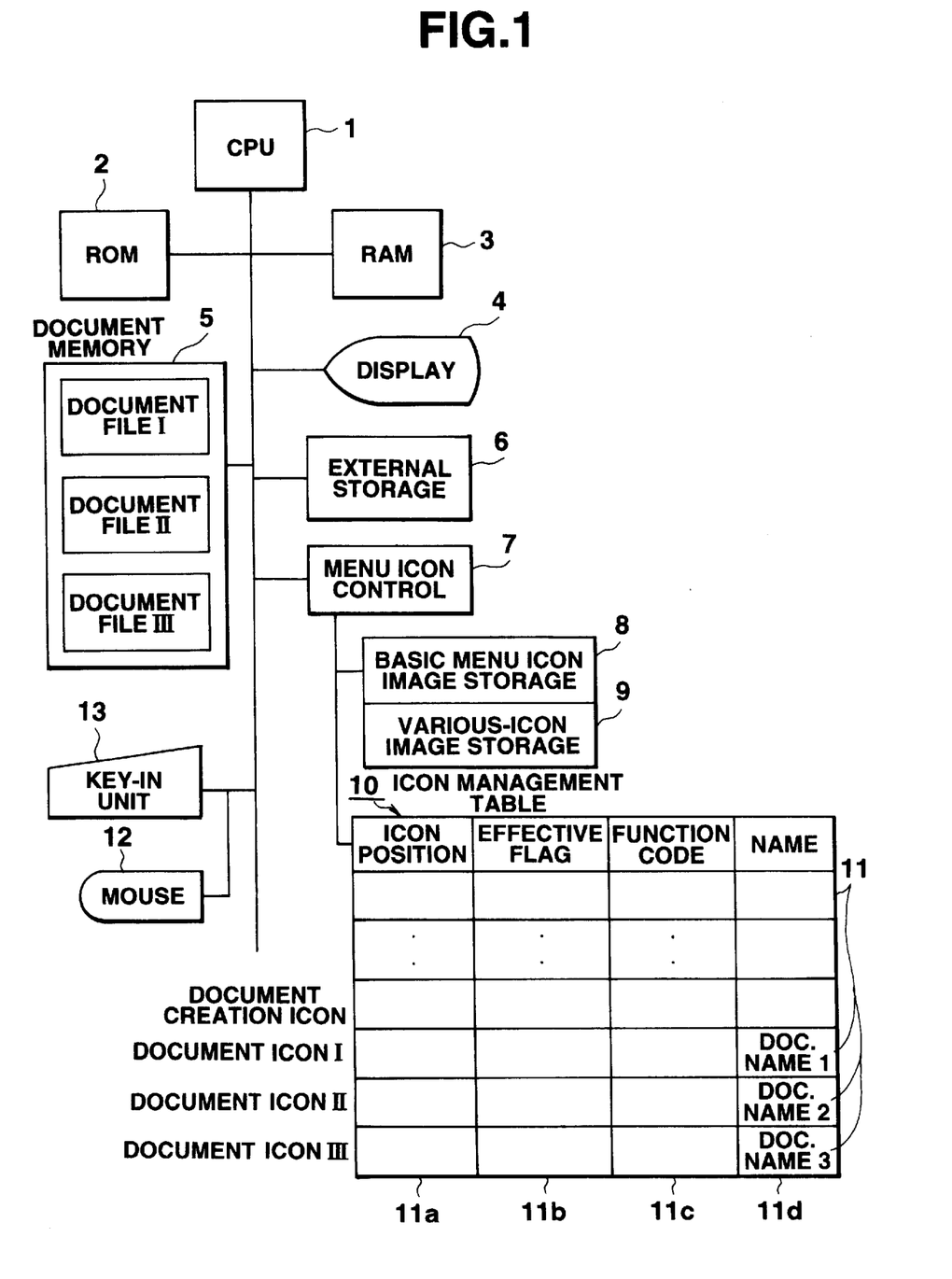
FIG. 1 is a system schematic of a first embodiment of a document creation device according to the present invention.

Referring to FIG. 1, the system composition of a first embodiment of a document creation device according to the present invention will be described.

As shown in FIG. 1, the document creation device is composed of a CPU (Central Processing Device) 1, a ROM (Read Only Memory) 2, a RAM (Random Access Memory) 3, a display 4, a document memory 5, an external storage 6, a menu icon control unit 7, a basic menu icon image storage 8, a various-icon storage image 9, an icon management table 10, a key-in unit 13 and a mouse 12.

The CPU 1 controls the whole document creation device on the basis of data input through the key-in unit 13 and the mouse 12. The ROM 2 contains control and other programs which the CPU 1 executes. The RAM 3 stores application programs which have document creation functions and a spreadsheet function and document data under edition at present.

The display 4 displays a GUI (Graphical User Interface) composed of a menu icon, and the contents of a document file selected through the GUI image screen, and includes, for example, a CRT (Cathode Ray Tube) display or a liquid crystal display. The document memory 5 is capable of storing up to three document files I, II, III, and, for example, includes a RAM disk or an IC memory card. The external storage 6 stores document files, and includes, for example, a magnetic disk device or an opto-magnetic disk device.

The menu icon control unit 7 performs the operations of displaying a menu on the GUI display screen of the display 4 and clicking the icon once or twice with the mouse 12.

Figure 2:
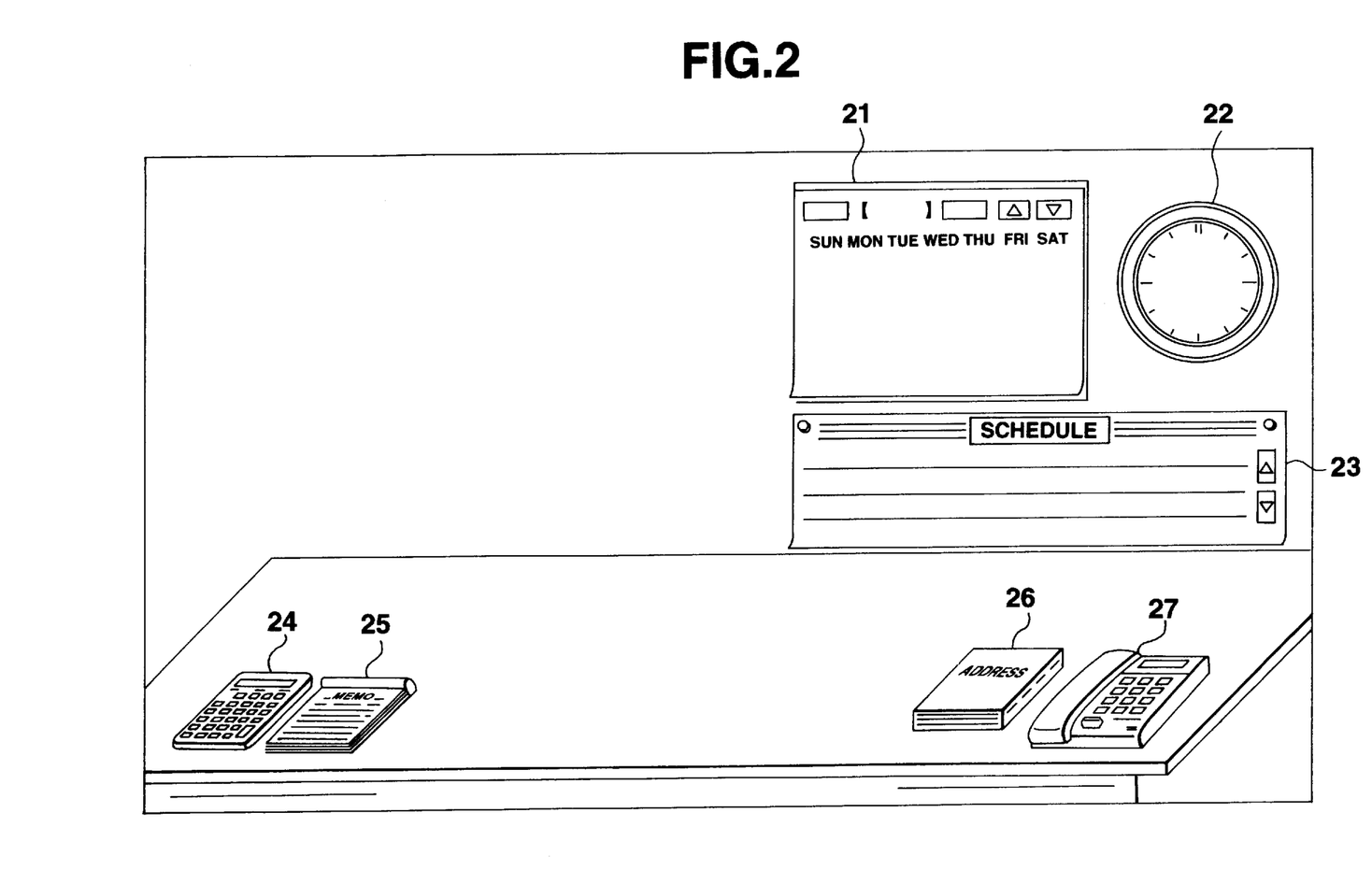
FIG. 2 is an illustration of a displayed basic icon image.

The basic menu icon image storage 8 stores data on the image of a basic menu icon displayed on a menu display screen (desktop display screen) of FIG. 2, and is composed, for example, of a semiconductor memory. The various-icon image storage 9 stores data on the images of other icons displayed on the menu display screen of FIGS. 3 and 4 and is composed, for example, of a semiconductor memory.

The icon management table 10 stores data 11 on management of each of icons disposed on the menu display screen of the display 4. The Table 10 is composed, for example, of a semiconductor memory as well.

The icon management data 11 includes four "icon position", "effective flag", "function code", "name" fields 11a–11d.

The "icon position" field 11a stores data on the position and size of a corresponding icon on the display and is used to determine, for example, which icon has been selected by the clicking operation of the mouse.

The "effective flag" field 11b stores an effective flag indicative of whether the corresponding icon is effective. How to use the effective flag will be described later.

The "function code" field 11c stores a code indicative of a function started up when the corresponding icon is selected. If the icon is, for example, a desktop calculator one of FIG. 2, the field 11c stores a code indicative of a desktop calculator mode.

The "name" field 11d stores data incidental to the corresponding icon. If the icon is, for example, a document one, the field 11d stores data on the name of a document file corresponding to the icon. If the icon corresponds to any one of various function modes such as, for example, those of the desktop icon 24 and a notebook icon 25 of FIG. 2, the field 11d stores data on the name of that functional mode.

The key-in unit 13 includes a keyboard through which data on a document file (document data) is input. The mouse 12 is a pointing device which has buttons used to select various corresponding icons displayed on the display screen 4 and also used for movement of the mouse cursor. While in the present embodiment the mouse 12 is used as the pointing device, another pointing device such as a track ball or a pen may be used instead.

FIG. 2 shows the image of a basic menu icon displayed on the display 4, where a calendar and a clock put on a wall, a schedule table attached to the wall, a desktop calculator, a memorandum, an address book and a telephone put on a desk are indicated by the icons 21–27, which express their corresponding images and basic various functions provided by the document processor according to the present embodiment. For example, when the desktop calculator icon 24 is selected on the display, the desktop calculator mode is started to provide the corresponding function.

Figure 3A:
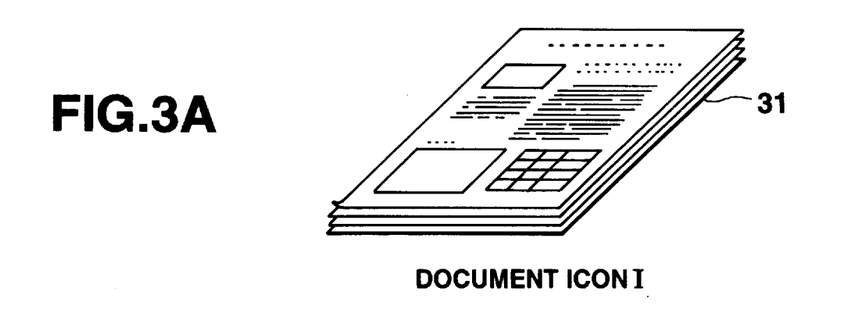
FIGS. 3A–3C are illustrations of a displayed document icon images.
Figure 3B:
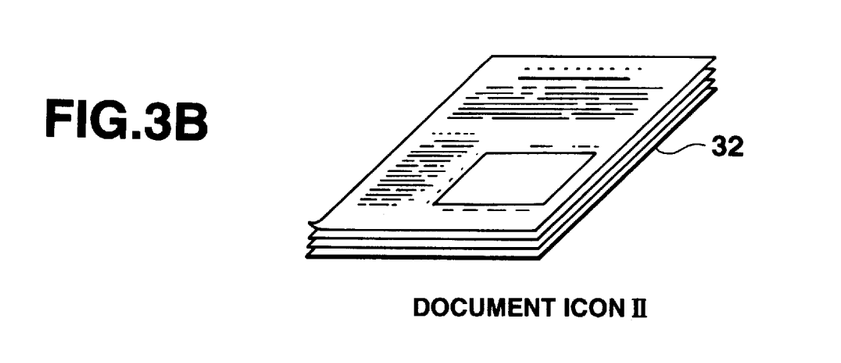
Figure 3C:
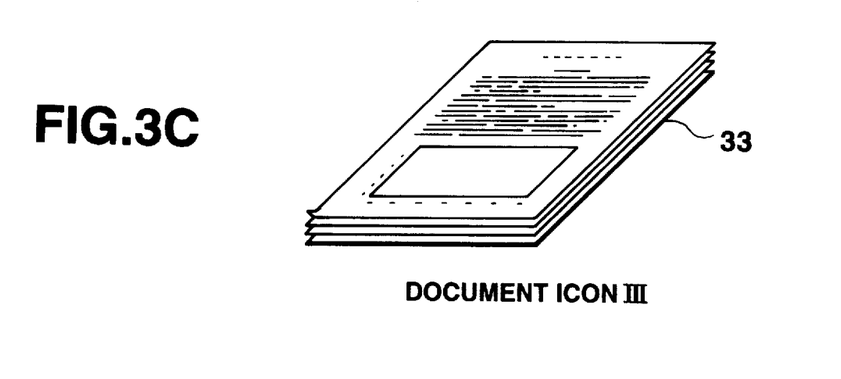
Figure 8:
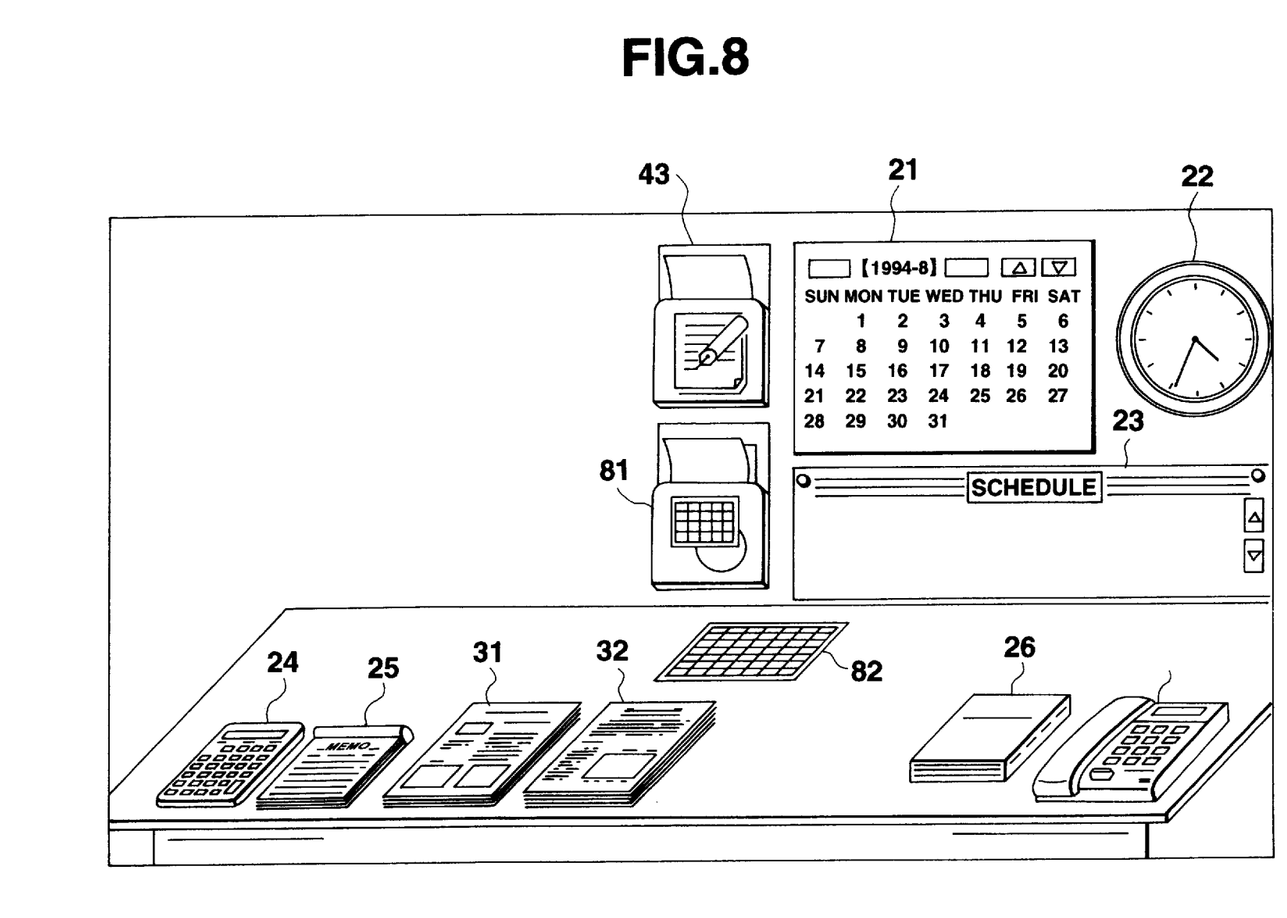
FIG. 8 shows an illustrative menu display screen where an icon indicative of a document creatable state is displayed.
Figure 9:
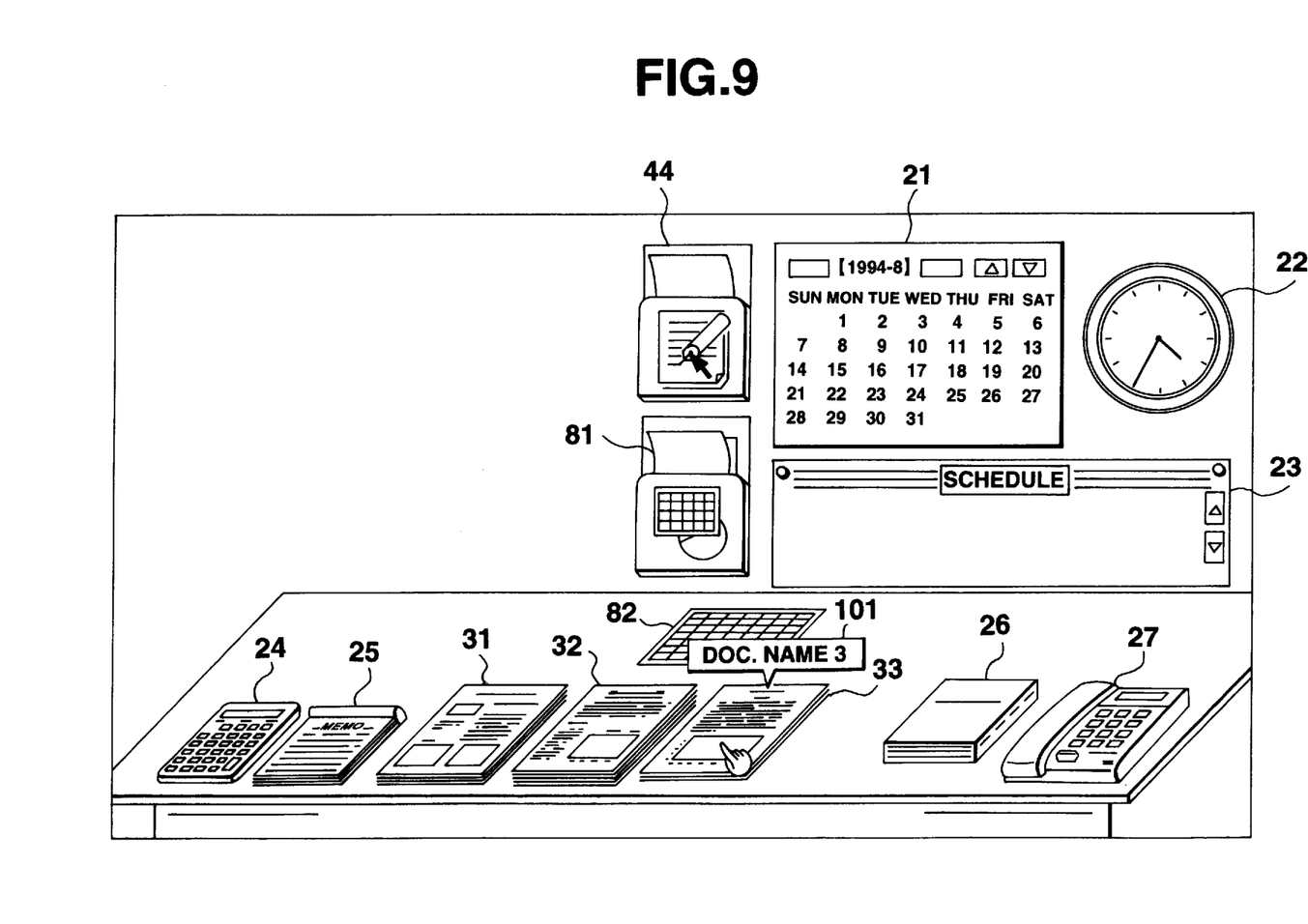
FIG. 9 shows another illustrative menu display screen where an icon indicative of a document creatable state is displayed.

FIGS. 3A–3C show document icons 31–33, respectively, displayed on the menu display screen when a document file is created in the document memory 5 in the present embodiment. When a document file I is created in the document memory 5, a document icon I 31 is displayed on the menu display screen, as shown in FIG. 3A; when a document file II is created, a document icon II 32 is displayed on the menu display screen, as shown in FIG. 3B; and when a document file III is created, a document icon III 33 is displayed on the menu display screen, as shown in FIG. 3C (FIGS. 8, 9). When in the present embodiment document files are created in the document memory 5, they are created necessarily in order of document files I, II and III.

FIGS. 4A–4D show four kinds of icons 41–44 displayed as document creation icons in accordance with the storing state of the document memory 5 in the present embodiment. A document file-creatable icon I 41 takes a form in which three sheets of paper is received in the folder to thereby indicate that three more document files are creatable at present in the document memory 5. A document file-creatable icon II 42 takes a form in which two sheets of paper is received in the folder to thereby indicate that two more document files are creatable at present in the document memory 5. A document file-creatable icon III 43 takes a form in which one sheet of paper is received in the folder to thereby indicate that one more document file is creatable at present in the document memory 5. A document file-uncreatable icon 44 takes a form in which no sheets of paper are received in the folder to thereby indicate that no more document files are creatable at present in the document memory. That is, one sheet of paper in the folder corresponds to one document file in those icons 41–44. The four kinds of icons 41–44 are managed together as a single document creation icon in the icon management table 10.

The operation of the present embodiment will be described with reference to flow charts of FIGS. 5 and 6 where S1, S2, . . . , each show a processing step number.

Figure 4D:
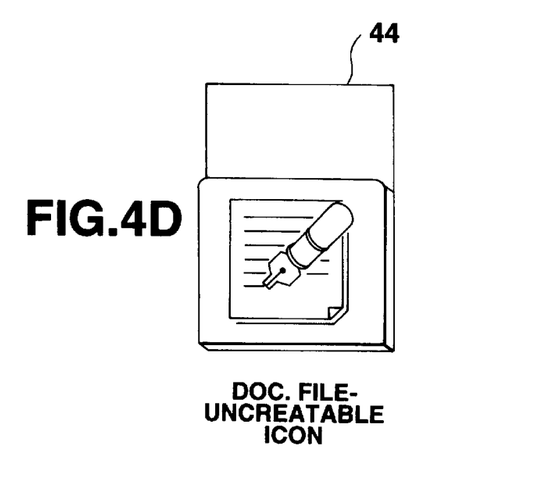
Figure 5:
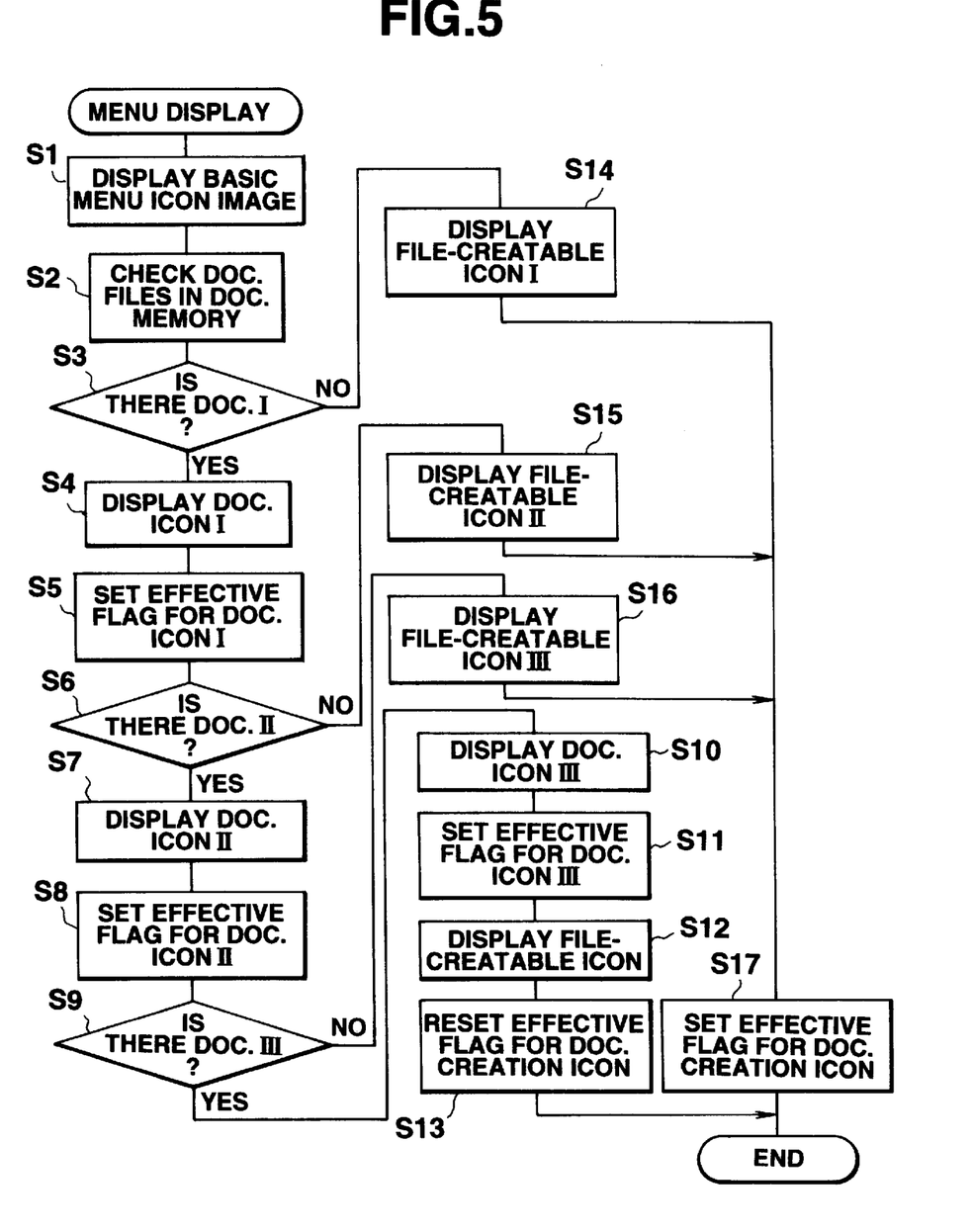
FIG. 5 is a flow chart indicative of a menu display operation performed by the present invention.

FIG. 5 is a flow chart indicative of a menu display process. When the user turns on a power source or depresses a menu key of the key-in unit 13, the CPU 1 starts up the menu icon control unit 7, which executes the menu display process. In this process, the menu icon control unit 7 reads data on the image of a basic menu icon from the basic menu icon image storage 8 and displays the image of the basic menu icon of FIG. 2 as a part of the menu display screen on the display 4 (S1). The menu icon control unit 7 then checks whether data on a document file is stored in the document memory 5 (S2). If so, (S3, YES), the menu icon control unit 7 displays a document icon I 31 corresponding to the document file I on the menu display screen at a predetermined position (S4). The menu icon control unit 7 then sets an effective flag in an effective flag field 11b for the icon management data 11 corresponding to the document icon I 31 in the icon management table 10 (S5). Similarly, if there is a document file II (S6, YES), the menu icon control unit 7 displays a document icon II 32 corresponding to the document file II on the menu display screen at a predetermined position (S7). The menu icon control unit 7 then sets an effective flag in the effective flag field 11b for icon management data 11 corresponding to the document icon II 32 (S8). Similarly, if there is a document file III (S9, YES), the menu icon control unit 7 displays a document icon III 33 corresponding to the document file III on the menu display screen at a predetermined position (S10). The menu icon control unit 7 then sets an effective flag in the effective flag field 11b for icon management data 11 corresponding to the document icon III 33 (S11). If all the document files I, II, III exist, no more document files are creatable. Thus, a document file-uncreatable icon 44 of FIG. 4D is displayed on the menu display screen at a position determined for document creation icon (S12). Furthermore, in order to indicate that no document creation icon is effective, the menu icon control unit 7 resets an effective flag in the effective flag field 11b for icon management data 11 corresponding to the document creation icon (S13).

Figure 4A:
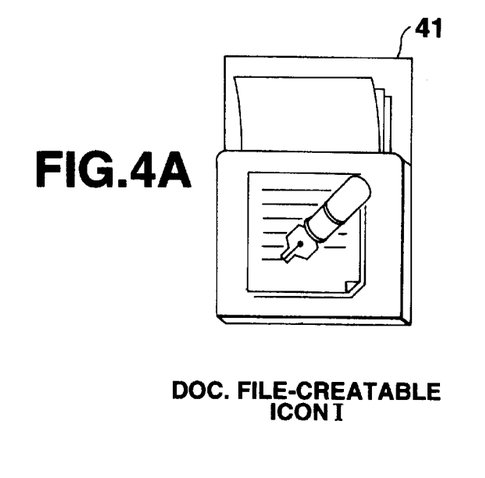
FIGS. 4A–4D are illustrations of a displayed document creation icon images.

Unless the document file I exists in the document memory 5 in step S3 (S3, NO), the menu icon control unit 7 displays the document file-creatable icon I 41 of FIG. 4A on the menu display screen at a position determined for the document creation icon (S14). The document file-creatable icon I 41 indicates that three more documents are creatable at present in the document memory 5, as described above.

Figure 4B:
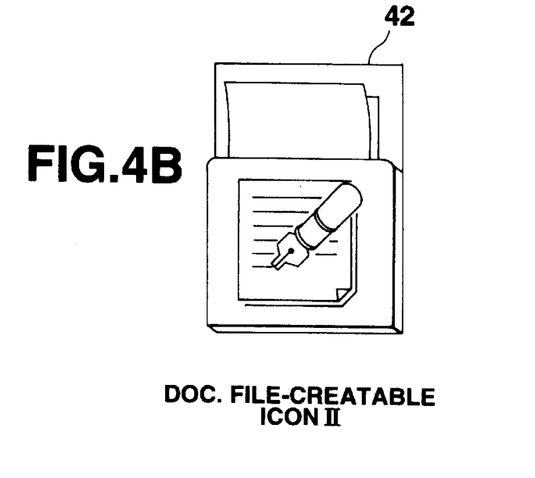

Unless the document file II exists in the document memory 5 (S6, NO), the menu icon control unit 7 displays the document file-creatable icon II 42 of FIG. 4B on the menu display screen at a position determined for the document creation icon (S15). The document file-creatable icon II 42 indicates that two more documents are creatable at present in the document memory 5, as described above.

Figure 4C:
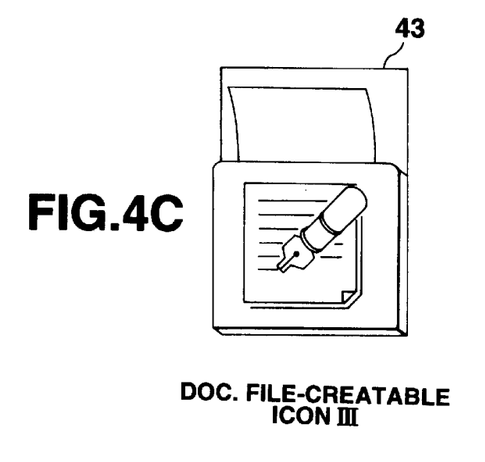

Unless the document file III exists in the document memory 5 (S9, NO), the menu icon control unit 7 displays the document file-creatable icon III 43 of FIG. 4C on the menu display screen at a position determined for the document creation icon (S16). The document file-creatable icon III 43 indicates that one more document is creatable at present in the document memory 5, as described above. In order to indicate that the document creation icon is effective after any one of the document file-creatable icons I, II and III is displayed in step S14, S15 or S16, the menu icon control unit 7 sets an effective flag in the effective flag field 11b for the icon management data 11 corresponding to the document creation icon (S17).

By the above operations, the shapes of the document creation icons on the menu display screen change as shown in FIGS. 8 and 9 in dependence on the stored state of document data in the document memory 5. In FIG. 8, the document file-creatable icon III 43 is displayed as document creatable or informs the user that especially one more document is creatable at present. In FIG. 9, a document file-uncreatable icon 44 is displayed, which informs the user that no new documents are creatable at present. As just described above, in the present embodiment, whether one or more new documents are creatable is immediately gripped only by viewing the shape of the document creation icon. In addition, when a document is creatable, how many further new documents are creatable is understood at a glance by three kinds of creatable icons I 41, II 42, and III 43 of FIGS. 4A, 4B and 4C, respectively.

Figure 6:
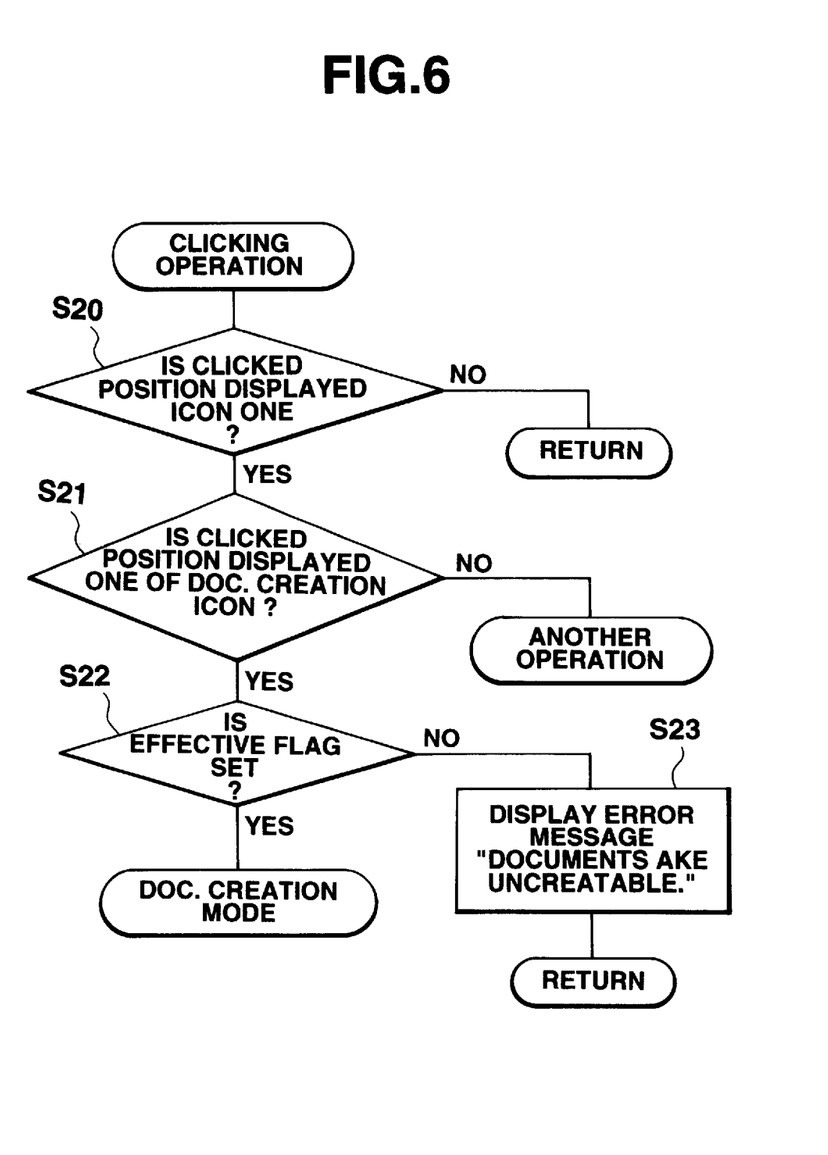
FIG. 6 is a flow chart indicative of a clicking operation performed by a first embodiment of the present invention.

FIG. 6 is a flow chart indicative of the clicking operation executed by the menu icon control unit 7 when the user clicks the menu display screen once or twice with the mouse 12. The user's operation is first detected by the CPU 1, which starts up the menu icon control unit 7, which is then supplied with data on the position where the clicking operation on the display has been performed.

When the menu icon control unit 7 is started up, first, it determines on the basis of data on the clicked position whether the clicked position corresponds to any one of the displayed positions of icons (S20). If not, (S20, NO), it determines that a senseless clicking operation has been performed and returns to its original operation.

When the main icon control unit 7 determines in step S20 that the clicked position is the displayed position of any icon (S20, YES), it further determines whether or not the clicked position is the displayed position of the document creation icon (S21). If not (S21, NO), the menu icon control unit 7 performs another operation depending on an icon other than the document creation icon displayed at that clicked position.

If the clicked position is the displayed position of the document creation icon (S21, YES), the menu icon control unit 7 refers to the icon management table 10 to determine whether the effective flag of the document creation icon is set (S22). If so (S22, YES), which indicates that a new document is creatable, the control of the menu icon control unit 7 passes to the document creation mode. If not (S22, NO), there is no empty area in the document memory 5 where new document files are creatable, which indicates that no new documents are creatable. Thus, an error message such as "No documents are creatable." is displayed on the display 4 (S23) and the menu icon control unit 7 returns to its original operation.

When the image of the display 4 is in a state of FIG. 8 due to the above operations and the icon III 43 indicating that a document is creatable is clicked, the document creation mode is started up. When the screen of the display 4 is in the state of FIG. 9 and the document file-uncreatable icon 44 indicating that no documents are creatable is clicked, an error message such as "No more documents are creatable." is displayed on the display 4 at a predetermined position.

While the above processes are for the document creation icons which create document files in the document processor, it is obvious that similar processes are applicable to icons for creating other data files. For example, the document processor of this embodiment has a spreadsheet function such that a spreadsheet creation icon 81 is displayed under each of the document creation icons 43 and 44 on the menu display screen, as shown in FIGS. 8 and 9. By selecting the icon 81, a spreadsheet mode is selected. The spreadsheet created in the spreadsheet mode is displayed as a spreadsheet icon 82 on the menu display screen. As just described, those icons 81 and 82 also have functions similar to those of the document creation icons 41–44 and the document icons 31–33.

Figure 7:
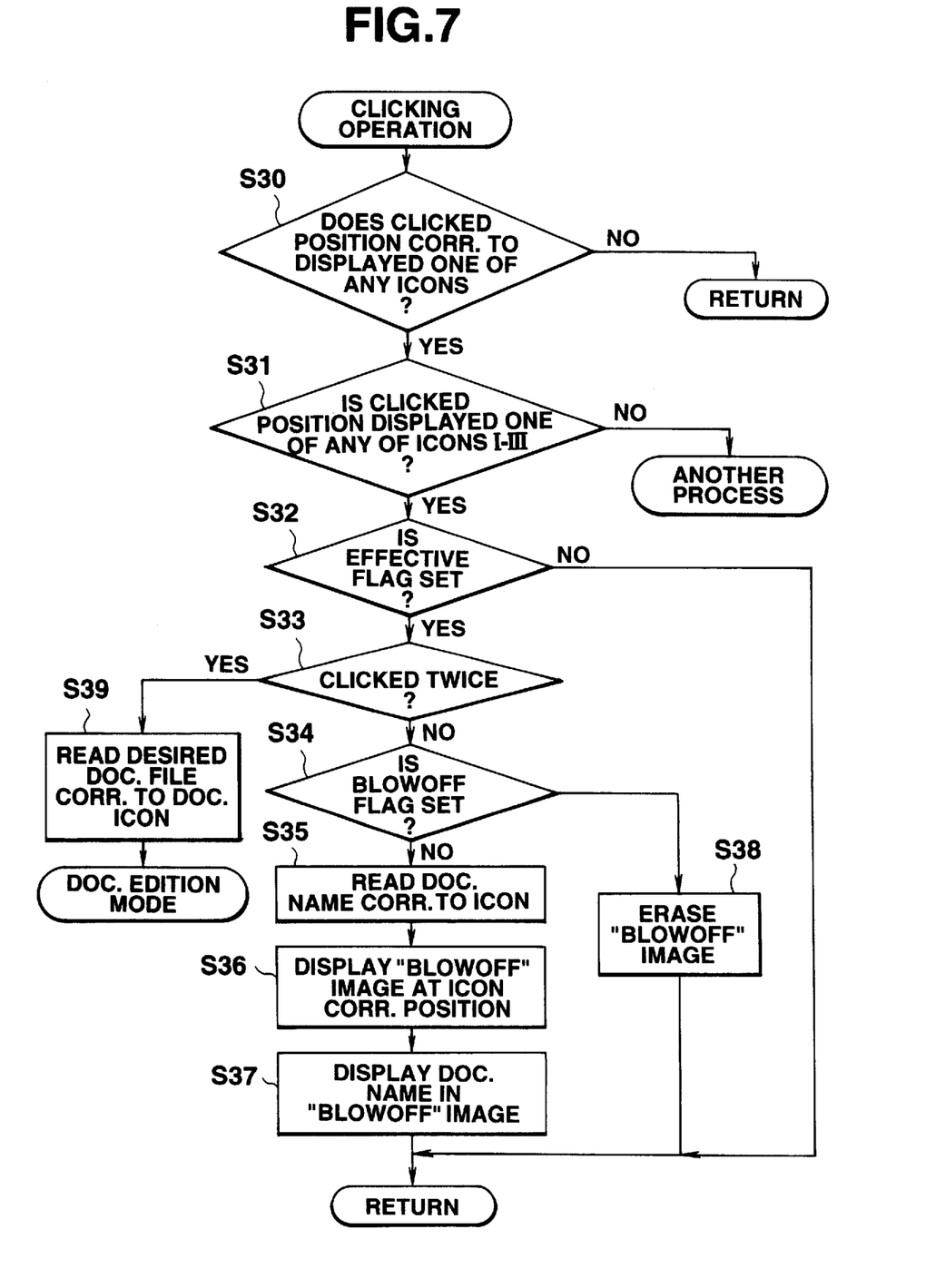
FIG. 7 is a second flow chart indicative of a clicking operation performed by a second embodiment of the present invention.

FIG. 7 is a flow chart indicative of the clicking operation performed when the user clicks the menu display screen once or twice with the mouse 12 in a second embodiment of the document processor according to the present invention.

The document processor of this embodiment has the same system structure as the first embodiment of FIG. 1 except for the structure of an icon management table thereof.

Figure 10:
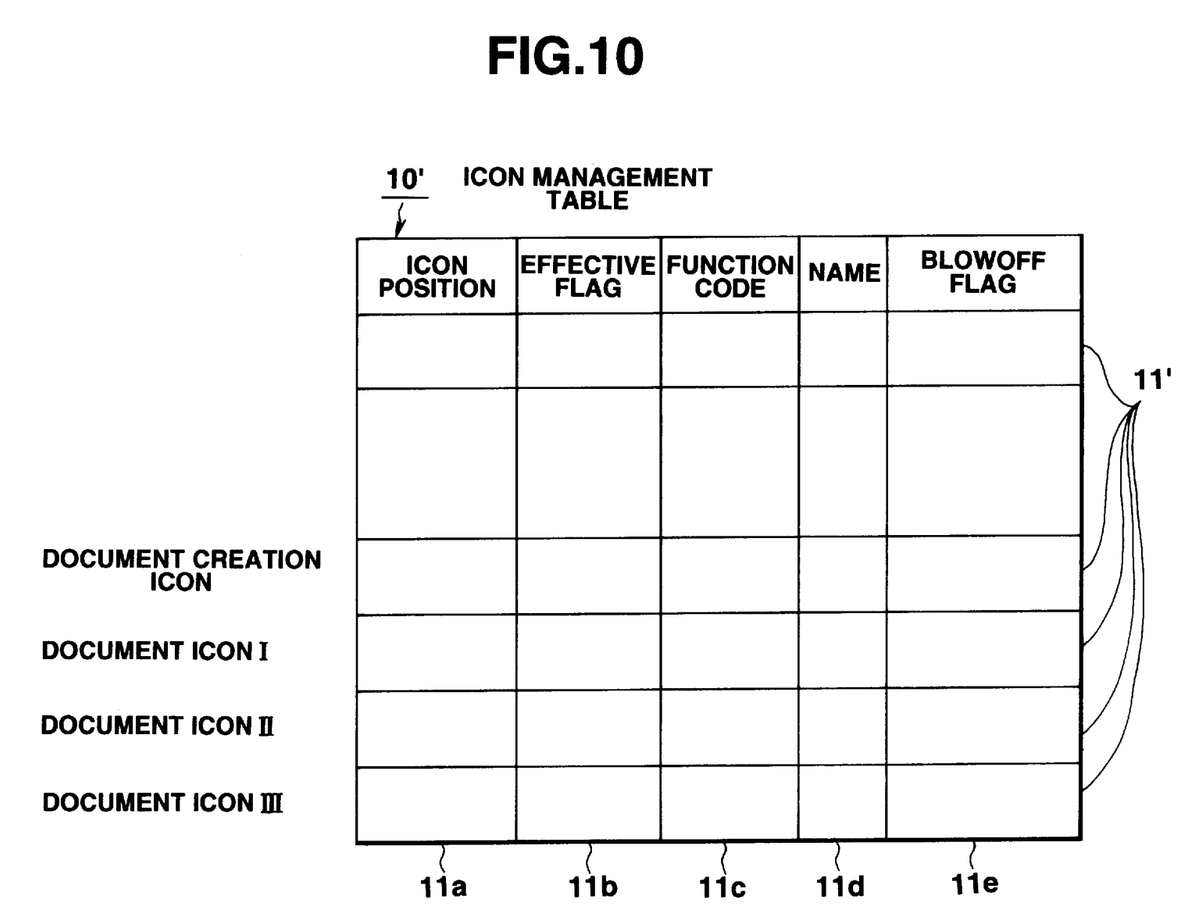
FIG. 10 shows the structure of an icon management table.

FIG. 10 shows the structure of an icon management table 10' referred to by the menu icon control unit 7 in the second embodiment instead of the icon management table 10 of FIG. 1.

The icon management data 11' of the icon management table 10' includes a combination of the icon management data 11 of the FIG. 1 icon management table 10 and a "blowoff flag" field 11e. The icon management table 10' has the same structure as the icon management table 10 except for the "blowoff flag" field 11e and further description thereof will be omitted. A "blowoff" flag indicative of whether a "blowoff" image to be later described is displayed at present in correspondence to an icon on the menu screen is set in the "blowoff flag" field 11e.

The process represented by the flow chart of FIG. 7 is executed by the menu icon control unit 7 as in the case of FIG. 6.

In the processing of FIG. 7, the menu icon control unit 7 first determines on the basis of clicked position data received from the CPU 1 which of the icon display positions the clicked position corresponds to (S30). Unless the clicked position corresponds to any of the icon display positions (S30, NO), the menu icon control unit 7 regards the user's clicking operation as senseless and returns to its original operation.

If the clicked position corresponds to any one of the icon display positions (S30, YES), the menu icon control unit 7 determines which of the display positions of the document icons I 31–III 33 the clicked position is (S31). If the clicked position is not any of the display positions of the document icons I 31–III 33 (S31, NO), the menu icon control unit 7 performs another operation depending on the clicked icon other than the document icons I 31–III 33.

If the clicked position is any of the displayed positions of the document icons I 31–III 33 in step S31 (S31, YES), the menu icon control unit 7 determines whether the effective flag of the clicked document icon (any of the document icons I 31–III 33) is set (S32). If not (S32, NO), the document icon is not displayed at present at the clicked position and a document corresponding to that document icon does not exist in the document memory 5. Thus, the menu icon control unit 7 returns directly to its original operation.

If the effective flag is set (S32, YES), the menu icon control unit 7 determines whether the clicked operation has been performed twice (S33). If so (S33, YES), the menu icon control unit 7 reads the contents of a document file corresponding to the twice clicked document icon from the document memory 5 (S39) and displays the contents of the document on the display 4. The menu icon control unit 7 then selects the document editing mode.

Figure 11A:
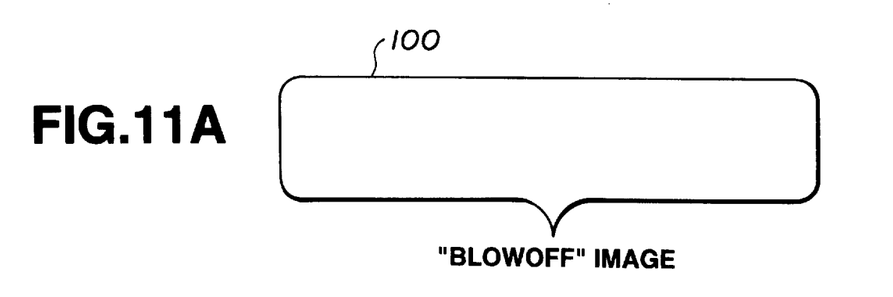
FIGS. 11A and 11B show an illustrative document icon and a corresponding illustrated document name, respectively.
Figure 11B:
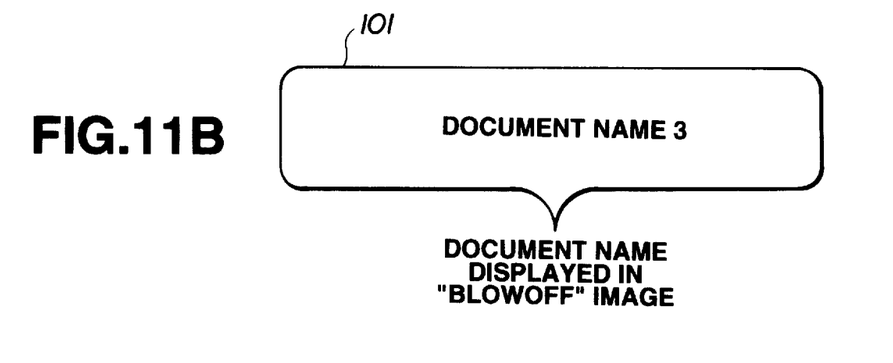

If the menu icon control unit 7 determines in step S33 that the clicking operation has been twice performed (S33, NO), it determines whether the blowoff flag for the clicked document icon (any of the document icons I 31–III 33) has been set (S34). If not (S33, NO), the menu icon control unit 7 reads the document name, data on which has been stored in correspondence to the clicked document icon, from the appropriate name field lid of the icon management table 10 (S35). The menu icon control unit 7 then displays a "blowoff" frame image 100 of FIG. 11A at a predetermined position corresponding to the document icon (S36) and displays a "blowoff" image 101 which includes a displayed read document name in the "blowoff" frame image 100, as shown in FIG. 11B (S37). The menu icon control unit 7 then returns to its original operation.

If the blowoff flag is set (S34, YES), the menu control unit 7 restores the menu screen image hidden by the "blowoff" image 101 to the original state to erase the "blowoff" image 101, and the menu icon control unit 7 then returns to its original operation.

When the document icon 33 is clicked with the mouse 12 in a state where the document icon 33 is displayed on the display 4, as shown in FIG. 9, a "document name 3" which corresponds to the document icon 33 is displayed above the document icon 33 in a "blowoff" image 101 such as is shown in FIG. 11B (S34–S37). When the document icon 33 is again clicked in a state where the "blowoff" image 101 is displayed, the "blowoff" image is erased and the original menu display is restored (S33, S34, S38).

As described above, when the respective document icons 31–33 are clicked, the corresponding document names of the document files I–III for the clicked document icons 31–33 are displayed in the corresponding "blowoff" images 101. Thus, it can easily be confirmed whether the document icons 31–33 correspond to desired document files I–III, respectively. When the respective document icons 31–33 are clicked twice after the confirmation, the corresponding desired document files I–III are called up on the display 4 (S33, S39).

Thus, without opening the respective document files I–III, the respective document names of the document files I–III corresponding to the document icons 31–33 can be confirmed to thereby prevent respective wrong document files I–III from being opened on the display 4.

When the document names of the document files I–III corresponding to the respective document icons 31–33 have solely been confirmed, only two clicking operations are required, i.e., to confirm the respective document names and to close the corresponding "blowoff" images 101.

When the relationship in correspondence between the document files I–III and the document icons 31–33 is known, that of the document icons 31–33 corresponding to a desired one of the document files I–III is first required to be clicked. Thus, the contents of the desired document are immediately called up on the display 4 screen (S33, S39).

While in the above description data to be displayed when an icon is selected is for the name of a corresponding one of the document files I–III for the document icons 31–33, other data incidental to the icon, for example, the name of an operational mode started up by the selection of the icon (for example, the desktop calculator mode or memorandum mode) may be displayed. Thus, a desired operational mode can be started up without mistakes to thereby improve the efficiency of the operation.

The data files may be various other data files such as data bases in addition to the above document files and spreadsheets. For the various other data files, the name of a desired one of them may be displayed like the above document files in accordance with the display of a document file-creatable or uncreatable icon or otherwise designation of an icon indicative of a desired one of those data files with a pointing device such as a mouse.

The method of displaying the document names is not limited to that of displaying the "blowoff" image 101, and other forms of display may be used.

What is claimed is:

1. An icon menu display device for a file processing system which opens a plurality of data files in a memory and processes the opened data files individually, said device comprising:

a plurality of file icons each having a different form, said plurality of file icons corresponding in number to a number of new data files openable in the memory;

detecting means for detecting a number of the data files opened in the memory when a predetermined menu image is displayed on a display screen;

selecting means for selecting one of said plurality of file icons on the basis of the detected number of data files opened; and display means for displaying the selected file icon on the display screen at a predetermined position;

wherein said detecting means comprises means for detecting whether a new data file is unopenable;

wherein said selecting means comprises means for selecting a particular file icon indicating that a new file is unopenable when said detecting means detects that a new data file is unopenable;

wherein said display means comprises means for displaying the selected particular file icon on the display screen at the predetermined position responsive to said selecting means selecting the particular file icon; and wherein said icon menu display device further comprises means for displaying a message that a new file is unopenable when the selected particular file icon is pointed out by a pointing device in a state where the selected particular file icon is displayed on a menu display screen.

2. An icon menu display method for a file processing system which opens a plurality of data files in a memory and processes the opened data files individually, said method comprising the steps of:

detecting a number of the data files opened in the memory when a basic menu is displayed on a display screen;

selecting one of a plurality of file icons each having a different form based on the detected number of data files opened; and displaying the selected file icon on the display screen at a predetermined position;

wherein said detecting step comprises detecting whether a new data file is unopenable;

wherein said selecting step comprises selecting a particular file icon indicating that a new file is unopenable when it is detected that a new data file is unopenable;

wherein said display step comprises displaying the selected particular icon on the display screen at the predetermined position responsive to the particular file icon being selected; and wherein said icon menu display method further comprises the step of displaying a message that a new file is unopenable when the selected particular file icon is pointed out by a pointing device in a state where the selected particular file icon is displayed on a menu display screen.

* * * * *